FIG. I

INVENTOR
AHMAD M. MOUSTAFA

BY SEMMES & SEMMES
ATTORNEY

Nov. 4, 1969

A. MOUSTAFA 3,476,570

OLEAGINOUS MATERIAL RECLAMATION PROCESS

Filed Jan. 22, 1968

INVENTOR

AHMAD M. MOUSTAFA

BY SEMMES & SEMMES

ATTORNEY

United States Patent Office 3,476,570
Patented Nov. 4, 1969

3,476,570
OLEAGINOUS MATERIAL RECLAMATION PROCESS
Ahmad Moustafa, 5226 Vine St., Cincinnati, Ohio 45217
Continuation-in-part of application Ser. No. 369,844, May 25, 1964. This application Jan. 22, 1968, Ser. No. 707,346
Int. Cl. A23d 3/00, 5/00
U.S. Cl. 99—118          10 Claims

ABSTRACT OF THE DISCLOSURE

This is a process for reclaiming edible oleaginous material from damaged parchment wrappers, cartons and related plastic containers (packaging materials), commonly used in the consumer packaging of margarine and related oleaginous products. Since these packaging materials are often imperfectly prepared, it is highly desirable to reclaim the adhering and/or absorbed oleaginous materials therefrom. This reclaiming process comprises the following five basic steps:
(I) A melting of the oleaginous fat from the packaging materials;
(II) A screening thereof. In the case of plastic containers, screening is preceded by a shredding of plastic containers;
(III) A washing of the packaging materials and further screening;
(IV) A centrifuging of the resultant emulsion of Step III aforesaid;
(V) A vacuumizing of the reclaimed oleaginous materials resulting in recovery of a pure oil.

CROSS REFERENCE TO RELATED APPLICATIONS

This application is a modification of the invention described in applicant's U.S. application Ser. No. 369,844, filed May 25, 1964, now abandoned and entitled Fat Reclamation Process. The present application is a continuation-in-part thereof.

BACKGROUND OF THE INVENTION

Field of the invention

The invention relates to a means for recovery of pure edible oil for reconstituting said oil from the oleaginous materials clinging to rejected prints, wrappers, plastic containers and the like, such as are offered to the consumer industry (or trade).

Description of the prior art

In the process of manufacturing consumer packages of margarine in one pound, one-quarter pound parchment-wrapped prints and plastic containers known as "tubs," there are inadvertently created many damaged and hence rejected packages. For example, over the span of three normal 8-hour production shifts, the number of rejected packages may reach in percentage, 0.5–1.5% of the total production. It is a well-known fact that the edible oil used in the manufacture of margarine and related products is very costly. When compared to the selling price of the finished product, for example, in the case of margarine, the cost of the fat becomes significant when it is considered that the fat comprising the oleaginous material constitutes 80% of the total weight of the end product. Thus reclamation of all the oleaginous materials from the rejected packages creates a very serious economic problem in the industry.

In the prior art processes of existing manufacturing plants, rejected one pound, half pound and quarter pound prints, with their protective parchment paper still attached, are placed into a stainless steel basket-type strainer poised over a stainless steel jacketed tank. Hot margarine emulsion is re-cycled by a sanitary pump over the contents of the stainless steel basket strainer which causes the rejected margarine prints to melt and flow free of the surrounding wrapper and into the tank below.

In some other plants, it has been the practice to charge a stainless steel tank of suitable size with the damaged and rejected margarine print with its wrappers still attached. Direct steam is injected into the entire mass, while very mild agitation is applied to hasten the transfer of heat in order to melt the congealed mass. The often results in scorching of the milk solids, the oxidation of the oil phase and the possible adulteration of the resulting emulsion with the water softening ingredients used in conjunction with the production of steam as well as the admittance of heavy metal contaminants from the system itself.

Other manufacturing plants refrain from the use of live steam for the above cited reasons and elect to circulate hot water at 160°–180° F. in the tank with very mild agitation, manual or mechanical, being applied until all damaged margarine is reduced to a liquid emulsion.

When melting is complete, the wrappers are withdrawn from the strainer or tank and squeezed in a sanitary type press to render as much additional fat as possible.

After squeezing, the wrappers, still containing a high ratio of fat to packaging material heretofore have been disposed of as waste. Alarmingly, it has been determined that at least 75% of the total weight of this waste material consisted of the valuable oleaginous product. Projected on an annual basis, waste of this expensive fat appreciably reduces profits in the manufacture of margarine.

In any of the above mentioned or cited practices, it is unavoidable that the resulting emulsion will be contaminated with ink pigments, packaging material viz: cellulose fibers, and wrappers sizing components and the like which are carbohydrate in nature, constituting adulteration of the rendered oleaginous emulsion.

The resulting emulsion containing the adulterated oil has, in the past, been used directly and without further processing, in the manufacture of margarine and related products. As a consequence, the ultimate reconstituted margarine product will contain minute quantities of the mentioned adulterants such as cellulose, ink and sizing. And there are undesirable volatile flavor components derived from the packaging materials, viz: sulphite, etc. Margarine and related food products when thereafter manufactured from the reconstituted product will not meet the standards of identity, established by the Food and Drug Administration of the United States. Additionally, where there has been oxidation of the fat by the action of the live steam, a reduction in shelf life of the product made from the reclaimed fat occurs, resulting in a substantial premature deterioration of the product. In the present process, the shorter contact time (⅛) between heat and emulsion results in reducing to a minimum any of the indicated undesirable chemical and/or bacteriological changes—adversely effecting taste and shelf life of the reconstituted product.

SUMMARY OF THE INVENTION

The invention broadly covers reclaiming oleaginous comestibles from damaged containers including pulp wrappers, plastic tubs and the like by the steps of initially melting the oleaginous material from the containers, screening said melted material from the containers, washing the containers and re-screening the oleaginous material therefrom while at the same time carefully controlling the water content of the emulsion and separating the oil phase from the water phase by centrifugation and thereafter evaporating trace amount of water from the recovered oleaginous material to yield a pure oleaginous oil which is free of adulterants and/or contaminants and which meets the standards of the Food and Drug Administration of the United States Department of Agriculture. In initially melting the oleaginous material from the containers, it is preferred that the melting be accomplished by either a heated oleaginous substance bath or hot water bath.

The objectives of the invention include reclaiming oleaginous material from damaged packages, wrappers and plastic containers that is entirely sanitary, that is capable of recovering an unadulterated, unchanged consumable oleaginous fat; that is continuous, automatic and adapted to commercially available equipment of the food industry.

DESCRIPTION OF THE PREFERRED EMBODIMENTS

Figure 1:
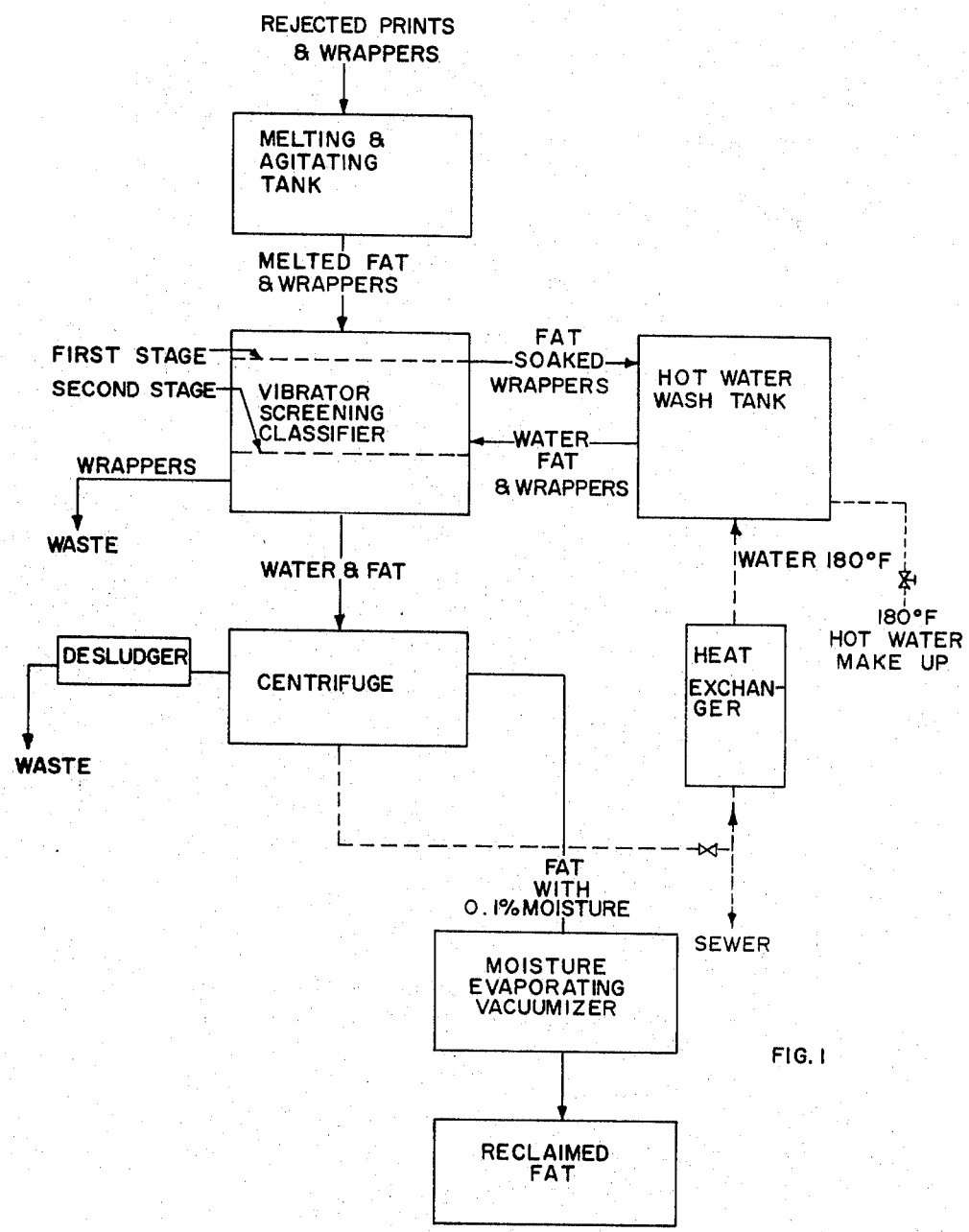
FIG. 1 is a schematic flow diagram, indicating the interrelation of the basic steps of the recovery process.

Referring to FIG. 1, the flow sheet, rejected and damaged prints, wrappers, plastic containers, etc. otherwise defined as packaging materials, are introduced into the Step I heating and agitating tank, proceeding thereafter through the steps of: melting and agitating; (II) first stage screening; (III) washing; (IIa) re-screening; (IIIa) centrifuging; (IV) vacuumizing until the final reclaimed oleaginous product is collected and stored.

In the first step, sufficient hot water (180° F.) and oleaginous material is supplied to the agitating tank 11, permitting thus the packaging materials to be received in a reservoir for complete melting while mild agitation is simultaneously provided to prevent localized super heating of the emulsion or scorching of milk solids. The mild agitation is controlled at a slow speed, for example, between 300 and 400 r.p.m. depending upon the size and configuration of tank and propeller blade. By means of blunt agitating propellers one avoids thereby shearing and/or pulping of the packaging materials and ensures that reduction in size thereof is held to a minimum.

In Step II, heating is continued until the temperature of the emulsion itself, which has been derived from the rejected quarter pound prints with their packaging materials still attached as well as all other types of machine rejects, reaches an optimum temperature of between 165° and 185° F. Interestingly and important in the process is the fact that the contact time of oleaginous material herein, to temperatures ranging in the vicinity of 165°–185° F., is reduced to one-half hour; whereas in the old processes the "contact time" of the material to be recovered was maintained at 4 hours for a 500 gallon batch, by way of example. In this process, Step II, the melted emulsion and packaging materials are then physically pumped to the first stage of a vibratory screening classifier, which is preferably self-cleaning. The emulsion consisting of fat and milk and water is then passed down through the first stage screen and the oil-saturated wrappers and oil-soaked packaging materials, be it plastic or otherwise, are thereafter transferred into an adjacent hot-water wash tank similar in size to tank 11 and maintained again at between 165°–180° F. Mild agitation of the same order and magnitude as is applied in the first tank, is again applied in the wash tank whereupon the water and oil suspension together with the packaging materials suspended therein are returned to the second stage of the vibratory screening classifier; said washed packaging materials being thereupon vibrated to the edge of the screen and removed as waste. The combined oil, milk and water emulsion from the first stage and the water and oil suspension from the second stage, leaving the vibratory screen classifiers are withdrawn by a common outlet into an intermediate surge tank, the surge tank serving as a reservoir to ensure a continuous flow to the self desludging centrifuge, once the process is commenced. Describing the process in general up to this point, between screenings (Step II) and centrifuging (Step III), oil concentration in the diluted emulsion in the surge tank is controlled at from 20 to 35% by adjusting the speed of the margarine emulsion and water-oil suspension pumps respectively feeding to first and second stages of the vibrating screen classifier. Thus, one maintains the proper equilibrium line inside the centrifuge bowl for maximum separating efficiency. This ratio of oil concentration in the diluted emulsion is indirectly proportional to the rate of feed into the centrifuge. Thus, the higher the oil content in the sump emulsion, the lower the maximum rate of flow into the centrifuge. In a 500 gallon batch, these data would be considered normal:

Rate of oil content in sump emulsion is 25 percent.
Rate of flow thereof into centrifuge—10,000 pounds per hour.

If one exceeds the 35% ratio of oil to water, a risk is run of losing valuable oil to the sewer. Additionally, one runs the risk of exceeding the maximum allowable limit of $\frac{1}{10}$ of 1% water content in the recovered oil being fed to the vacuumizer from the centrifuge. Optimumly, the range of oil to water is 25% as it is fed to the centrifuge.

Separated oil leaving the centrifuge is found to have trace amount of moisture amounting to less than one-tenth of one percent. The valuable hot material therefore is passed into a vacuumizer maintained under a minimum of 26 inches of mercury vacuum, (step IV), where the remaining moisture is flash evaporated and the moisture-free oil is then pumped into a storage tank.

Non-reusable suspended solid ingredients of the margarine as well as packaging material fragments which pass through the fine mesh screen are removed from the centrifuge by the desludger, which at pre-determined regularly timed intervals discards them as waste. Two thirds of the recovered water phase leaving the centrifuge is recirculated to wash tank 31 and the remaining one-third is diverted to the sewer and is replaced with fresh make-up hot water at 165°–180° F., the purpose being to prevent salt concentration as well as other impurities from building up in the wash tank and to ascertain the purity of the reclaimed oil.

Figure 2:
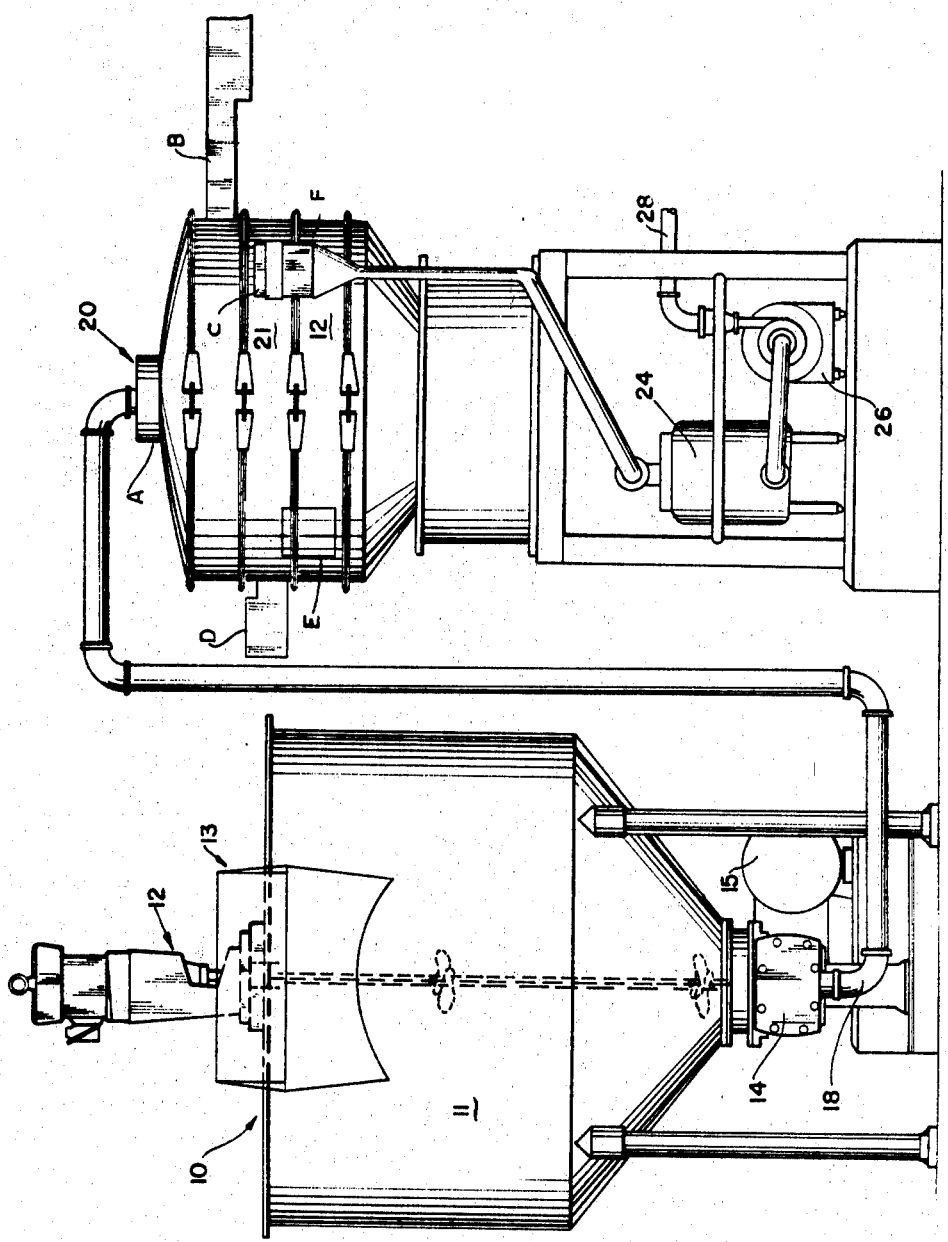
FIG. 2 is an elevation of sanitary equipment and piping for the melting and agitating and the vibratory screening of the oleaginous holding package materials.
Figure 3:
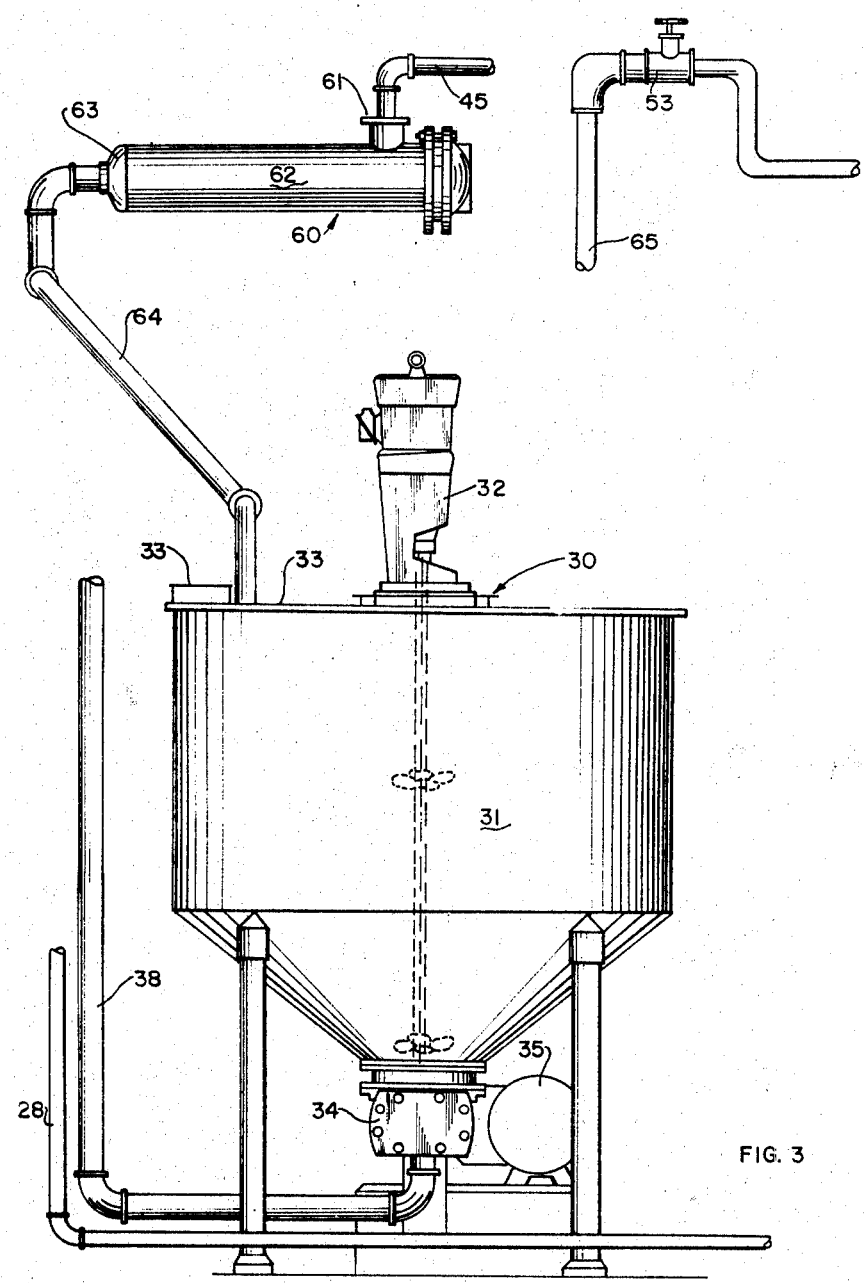
FIG. 3 illustrates apparatus for the washing of the oleaginous material coated and saturated containers.
Figure 4:
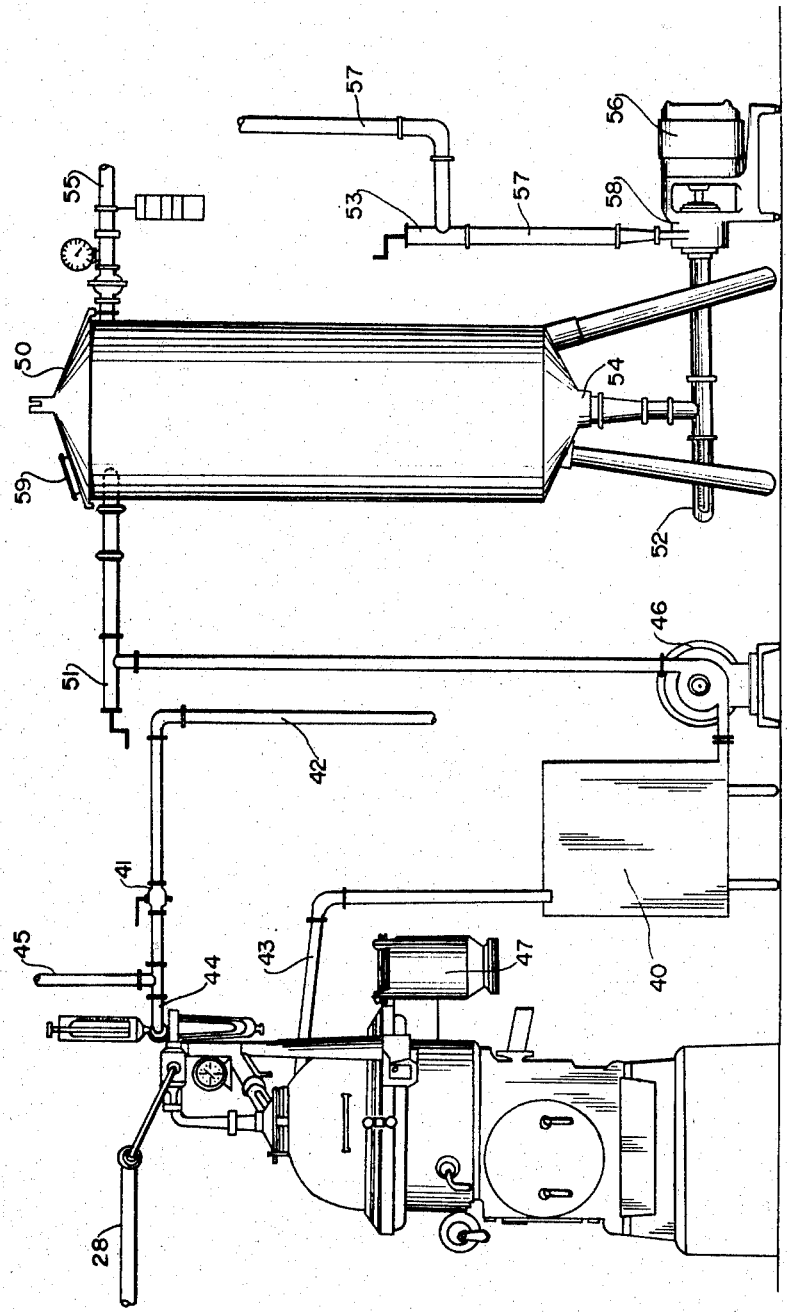
FIG. 4 illustrates equipment for the separating of oleaginous material from water, for removal of residual moisture, and for the collecting of pure, reclaimed oleaginous material.

Turning to FIG. 2, rejected and damaged margarine packaging materials are dumped into a covered and agitating tank 11, through port 13. An electric motor 12 with propeller shaft and propellers, shown in phantom view, provides locomotion to keep the melted mass in movement, preventing over-heating or scorching, and insuring uniform distribution of the packaging materials in the liquid mass to facilitate pumping. The melted margarine emulsion and oil soaked packaging materials are transferred by motor 15-driven pump 14 through sanitary tubing 18, into port A of the first stage vibratory screening classifier 20. The oil emulsion penetrates the first fine mesh vibrating screen and emerges from port C, while the oil-soaked packaging materials advance to the outside of the screen and are exhausted through port B.

Port B discharges directly into an opening 33 in the cover of the hot-water wash tank 31. Make-up fresh hot water at 165°–180° F. is added to the wash tank 31 from pipe 65. Noteworthy is the fact that the higher the temperature of the emulsion above 165° F., the better the separation of the oil phase from the water phase. If the temperature drops below 165° F. more water than is desirable passes with the recovered oil as well as discarding packaging material containing oleaginous material. In other words, removal of oil from the packaging material is directly proportional to the operating temperature.

Also, the efficiency of oil removal from the packaging materials is dependent upon the ratio of water to paper within the wash tank. It has been found that optimum ratio of between 90–95 parts of water to 5 to 10 parts oil soaked packaging material and/or innerwrappers is most satisfactory. Agitating the water, oil and packaging materials is accomplished by electric motor 32 and its attached propellers which are shown in phantom view. The agitation insures intimate contact or thorough wetting of wash water and packaging materials allowing thereby maximum oil extraction.

The entire mass is then propelled by pump 34, driven by electric motor 35, through tubing 38 into port D of the second stage of the vibratory screening classifier 20 shown in FIG. 2. The water and oil suspension passes through second stage fine mesh screen to port F and the water-soaked packaging materials are exhausted circumferentially through port E. The combined fat and water emulsion from ports C and F is then deposited in surge tank 24 and is propelled therefrom by pump 26 through sanitary piping 28 into the self desludging centrifuge.

After being operated upon by the centrifuge, the oleaginous material now containing no more than one-tenth of one percent moisture, passes through pipe 43 to a second surge tank 40. Sanitary pump 46 moves the recovered oleaginous material past valve 51 into a modified moisture-evaporating vacuumizer 50, kept under a minimum of 26" Hg vacuum by a conventional vacuum pump. Moisture free oleaginous material is withdrawn through port 54 of the vacuumizer by sanitary pump 58, driven by electric motor 56, which propels the oil through pipe 57 and past vacuum valve 53 into a fat storage tank (not shown).

The centrifuge is equipped with a self desludging type bowl, which collects all suspended solids mainly cellulosic and plastic solids and deposits them to waste through port 47. The time lapse between desludgings is dependent upon the degree of agitation and extent of fragmentation the packaging material have been subjected to in emulsion tank 11 and wash tank 31.

Although this invention has been disclosed by way of specific example, it would be obvious that it may be useful in reclaiming many food and non-food products. The scope of the invention is therefore precisely defined only in the appended claims.

I claim:
1. In a process for reclaiming edible oleaginous substance from damaged packaging, the steps of:
 (A) bath melting the substance to form an emulsion at a temperature which avoids the scorching of milk solids, while mildly agitating in a confined area the packaging materials containing the substance;
 (B) initially screening the melted emulsion from said packaging components while thereafter
 (C) heat washing with water the packaging components to further remove the still adhering oil oleaginous substance;
 (D) rescreening said packaging components to finally separate oleaginous substance therefrom followed by a
 (E) centrifuging of the resultant emulsion of the oleaginous substance of said washing and screenings said emulsion having an oil concentration ratio which is not in excess of 35% to water followed by
 (F) vacuumizing recovered oleaginous substance to relieve it of substantially any trace amounts of water, recovering thereby pure oil.

2. The process according to claim 1 in which the melting is effected by bathing the packaging components initially in a bath of heated oleaginous substance concurrently while agitating same.

3. The process according to claim 1 in which the melting is effected by hot water bathing of the materials in the confined area.

4. The process according to claim 1 in which the melting is effected by bathing the materials in both hot water and an heated oleaginous substance.

5. The process of claim 2 in which the bath is sufficient to raise the temperature of the packaging materials to within the range of 165°–180° F.

6. The process of claim 2 in which melted emulsion and packaging components are vibratory screened precedent to heat washing of the packaging components, yielding an emulsion of fat, milk and water, the washing being maintained at a temperature range of 165°–180° F., sequentially agitating while washing and vibrator rescreening for removal of washed oil free packaging materials as waste.

7. The process according to claim 6 in which oil concentration of emulsion is at from 20 to 35%, said concentration being controlled by feeding the melted oleaginous substance emulsion to first and second stage, vibratory screening, whereby as the oil content in the emulsion is higher, the lower the maximum rate of flow thereof into the centrifuging.

8. The process according to claim 7 in which by centrifuging, moisture content of the emulsion is reduced to less than $\frac{1}{10}$ of 1%.

9. The process according to claim 4 in which oil concentration of emulsion is at from 20 to 35%, said concentration being controlled by feeding the melted oleaginous substance emulsion to first and second stage vibratory screening, whereby as the oil content in the emulsion is increased, a decrease in the maximum rate of flow thereof occurs in centrifuging.

10. The process according to claim 9 in which by centrifuging, moisture content of the emulsion is reduced to less than $\frac{1}{10}$ of 1%.

References Cited

UNITED STATES PATENTS

| | | | |
|---|---|---|---|
| 2,193,871 | 3/1940 | Hanno | 260—412 X |
| 2,614,110 | 10/1952 | Davis | 260—412 |
| 2,558,869 | 7/1951 | McColm | 260—412 |
| 2,720,315 | 10/1955 | Peterson | 210—19 |

OTHER REFERENCES

Hunziker, O. F.: "The Butter Industry," 3rd ed., 1940, published by author, La Grange, Ill., pp. 508, 509.

Bailey, A. E.: "Industrial Oil and Fat Products, Interscience Publ., Inc., New York, 1951, pp. 666, 667.

MAURICE W. GREENSTEIN, Primary Examiner

U.S. Cl. X.R.

23—308; 99—122; 210—67, 69, 70, 71; 260—412, 412.4